United States Patent [19]

List et al.

[11] Patent Number: 4,457,180

[45] Date of Patent: Jul. 3, 1984

[54] PRESSURE MEASURING DEVICE

[75] Inventors: Helmut List; Peter Claasen; Rudolf Zeiringer, all of Graz, Austria

[73] Assignee: Hans List, Graz, Austria

[21] Appl. No.: 386,652

[22] Filed: Jun. 9, 1982

[30] Foreign Application Priority Data

Jun. 15, 1981 [AT] Austria ................................. 2668/81

[51] Int. Cl.³ .............................................. G01L 19/00
[52] U.S. Cl. ........................................ 73/756; 73/115; 73/706; 137/557; 137/625.4
[58] Field of Search ................ 73/756, 744, 115, 706; 137/625.4, 557

[56] References Cited

U.S. PATENT DOCUMENTS 3,463,010  8/1969  Hatschek .................. 73/756

Primary Examiner—Donald O. Woodiel
Attorney, Agent, or Firm—Watson, Cole, Grindle & Watson

[57] ABSTRACT

A pressure measuring device is provided with a change-over valve connecting the pressure sensor either with the pressure to be measured or with a reference pressure. The change-over valve is actuated by a separate control pressure and will protect the pressure sensor from the influence of the pressure medium to be measured in the spring-loaded idle position of the valve.

3 Claims, 2 Drawing Figures

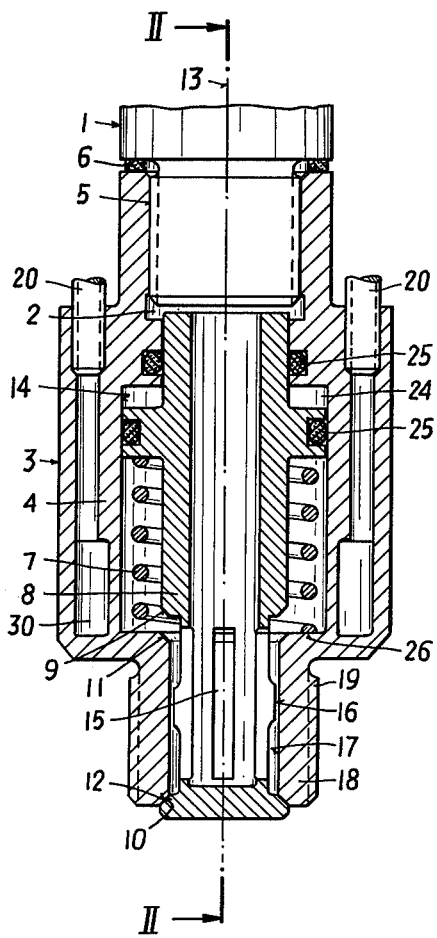
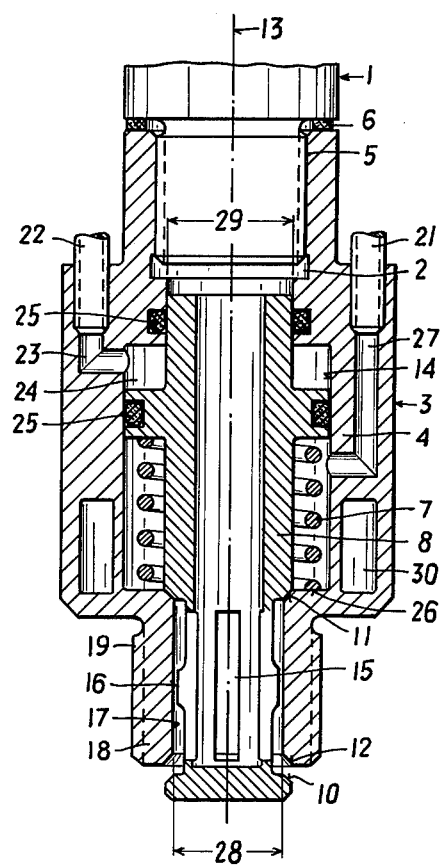

PRESSURE MEASURING DEVICE

BACKGROUND OF THE INVENTION

The present invention relates to a pressure measuring device comprising a pressure sensor and a change-over valve which connects the pressure sensor via a connecting channel to the point where the pressure is to be measured in its first position and to a pressure pipe serving as a reference standard in its second position.

DESCRIPTION OF THE PRIOR ART

A device of this type is described in German laid out print No. 1 648 574 in which the change-over is effected by a slide valve plate with parallel faces, which is actuated by a rotary magnet. This known type requires considerable design efforts—especially concerning the location of the drive of the slide valve plate; in addition, all parts containing the sealing surfaces or the individual input and output pipes are fairly complicated to produce and to assemble. Another disadvantage of this known type is that, even when the pressure sensor is connected to the reference pressure pipe, parts of the connecting channel leading towards the measuring site in the measuring device are open, so that, e.g., when the device is used for checking the pressure of the combustion chamber of internal combustion engines, these parts are being severely contaminated by the gases in the combustion chamber to which they are continuously exposed, which will most certainly affect the reliability of the measuring device.

SUMMARY OF THE INVENTION

It is an object of the present invention to avoid the above disadvantages of the known type of pressure measuring device and to develop a device of the above type such that any load on this device outside of the measurement proper which is taking place in the first position of the change-over valve only, is being avoided, while simplifying the design at the same time.

According to the present invention this is achieved by using for a change-over valve a spring-loaded double valve actuated by a separate control pressure medium, comprising a steering piston which is loaded by the valve spring and has two sealing surfaces cooperating with the respective valve seats on the housing of the change-over valve—their distance from each other being greater than that of the valve seats in the direction of motion of the steering piston—and by providing that the outer valve seat next to the measuring site is closed by the valve spring in the second valve position while the inner valve seat remains open, and further by designing the steering piston and its guiding bore in the housing such that they form a working chamber to which the control pressure may be applied counteracting the force of the valve spring, for changing over to the first valve position in which the outer valve seat is opened and the inner valve seat is closed. Designing the change-over valve as a double valve will ensure that the entire pressure measuring device is sealed against the measuring site while the pressure sensor is connected with the reference pressure pipe, thus preventing any mechanical wear, fouling or heat exposure of the interior components of the pressure measuring device. This is of major interest, e.g., if such a device is used for pressure control in the combustion chamber of an internal combustion engine, since in applications of this kind the measuring device will usually be coupled to the combustion engine for prolonged periods of time, even before or after the measurement proper, which—taken by itself—is a very short process only. The pneumatic or hydraulic actuation of the double valve will eliminate the need for any mechanical connection, e.g., a shaft for actuating the change-over valve, thereby ensuring independence of the physical features of the measuring site, e.g., design and location of the mounting bore. Another advantage of the design proposed by the present invention is that the change-over valve will automatically change to the "reference pressure" position, or remain in this position, in the case of absence of control pressure, e.g., due to a faulty device, on account of the spring load of the piston, thereby offering additional safety against contamination or excessive stress of the device during operation. The spring force may be generated by various known components, e.g., coil springs, disk springs, flexible elements, compressible gas cushions etc.

In an enhanced version of the invention the valve seats are designed as bevel seats which may be ground to provide a perfect seal even at maximum measurement or reference pressures.

For a further increase in operational safety, another proposal of the present invention provides that the surface area on the steering piston normal to its direction of motion, which is exposed to the pressure to the measured in the first valve position and is situated on that side of the piston which gives rise to a force co-directional with the control pressure, is larger than that pressure-exposed area which would cause an opening of the inner valve seat. This will ensure that in the first valve position, i.e., when the outer valve seat is open and the inner valve seat is closed for the measurement proper, the inner valve seat cannot be opened even in the case of maximum pressures to be measured, but will be closed all the more firmly.

DESCRIPTION OF THE DRAWING

Following is a more detailed description of the invention, as illustrated by the enclosed drawing wherein FIG. 1 is a partial longitudinal section through an embodiment of the present invention, and FIG. 2 is a section along line II—II in FIG. 1.

DESCRIPTION OF THE PREFERRED EMBODIMENT

The pressure measuring device shown comprises a pressure sensor 1 and a change-over valve 3 connected to the sensor via a connecting channel 2. The housing 4 of the change-over valve 3 has a threaded bore 5 at its upper end into which the sensor 1 may be screwed. A gasket 6 provides a seal between the valve housing 4 and the screwed-on sensor 1.

The change-over valve 3 is a spring-loaded, pneumatically or hydraulically actuated double valve, comprising a steering piston 8 loaded by a valve spring 7, with two sealing surfaces 9, 10 corresponding to two valve seats 11, 12 on the housing 4 of the change-over valve 3. The distance between the sealing surfaces 9, 10 along the axis 13 of the pressure measuring device, or rather in the direction of motion of the steering piston 8, is greater than that between the valve seats 11, 12 on the housing 4. Both the sealing surfaces and the valve seats are of a conical shape.

Basically, the steering piston 8 is a hollow cylinder sliding in a guiding bore 14 in the housing 4. In the area between the sealing surfaces 9, 10 the piston 8 is provided with peripheral slits 15 and a sliding surface 16 having some radial play relative to a lower guiding bore 17 contained in a mounting part 18. The mounting part 18 has a thread 19 on its outside by means of which the whole pressure measuring device may be screwed into a bore of a pressure chamber (not shown here).

The housing 4 of the change-over valve 3 is provided with two fittings 20 for the inflow and outflow of a cooling medium into/from a cooling chamber 30, and—at right angles to these—a fitting 21 for a reference pressure pipe and a fitting 22 for the control pressure pipe. The control pressure fitting 22 is connected via a bore 23 to a working chamber 24 in the housing 4 of the change-over valve, the chamber consisting of the steering piston 8 and its guiding bore 14 and being sealed by gaskets 25.

The valve spring 7, which is supported by a shoulder 26 of the stepped guiding bore 14, presses against that side of the steering piston 8 which is functionally opposite the working chamber 24.

When no control pressure is applied to the working chamber 24 via the control pressure fitting 22, the steering piston 8 loaded by the valve spring 7 assumes the second switching position shown in FIG. 1, in which the fitting for the reference pressure pipe is connected to the sensor 1, or rather to its pressure-sensitive element (not indicated in the drawing) via a duct 27, via the space of the guiding bore 14 containing the valve spring 7, the open valve seat 11, the peripheral slits 15 and the interior of the steering piston 8. In this second position of the piston the outer valve seat 12 next to the measuring site is closed, thus sealing the interior of the pressure measuring device against the environment whose pressure is to be measured.

When a pneumatic or hydraulic control pressure is applied via the fitting 22, the steering piston 8 is moved against the valve spring 7 until the inner valve seat 11 is closed and the outer valve seat 12 is opened in the first valve position shown in FIG. 2, thereby blocking the reference pressure from the pressure sensor 1 and connecting the latter with the pressure to be measured via the open valve seat 12, the peripheral slits 15 and the interior of the steering piston 8.

FIG. 2 shows the following. The surface area of the steering piston 8, as indicated by diameter 29, which is normal to the direction of movement of the piston and is situated on that side of the piston which—when exposed to the pressure to be measured in valve position one—gives rise to a force codirectional with the control pressure, is larger than that area, indicated by diameter 28, which—when exposed to the pressure to be measured—would tend to open the inner valve seat 11. Thus the inner valve seat 11 will remain closed even at the highest pressures to be measured, since the pressure exerted on the surface indicated by diameter 29 will only close it all the more tightly.

Switching the change-over valve 3 should preferably be done at a time when no pressure is applied to the measuring device since only then an interaction between reference pressure and pressure to be measured can be avoided.

The design of the device described is very simple, specifying lathed parts mainly. This will also permit to keep the overall diameter of the device rather small. By suitably grinding the two conically seated valves, a tight seat may be achieved which will ensure a perfect seal even at the highest pressures to be measured.

We claim:

1. A pressure measuring device comprising a pressure sensor, a change-over valve and a connecting channel which connects said sensor and said valve, said valve having two switch positions and connecting said channel to the point where the pressure is to be measured in its first position and to a pressure pipe serving as a reference standard in its second position, said change-over valve having a spring-loaded double valve actuated by a separate control pressure medium and comprising a housing having a guide bore, a steering piston axially movable along said bore, said bore extending from an end of said device adjacent a measuring site to an end thereof adapted for holding said sensor, said piston being loaded by a valve spring and having a pair of sealing surfaces spaced apart axially in the direction of piston movement, said housing having inner and outer valve seats spaced apart axially in the direction of piston movement, said sealing surfaces respectively cooperating with said valve seats, said sealing surface being axially spaced apart a distance greater than that of said valve seats, said steering piston having an axial blind bore extending from an end thereof adjacent said sensor and forming part of said connecting channel, said piston having openings extending between said sealing surfaces from said blind bore and outwardly of said piston, wherein said outer valve seat lies adjacent the measuring site, and is closed due to the action of said valve spring in said second valve position while said inner valve seat remains open, and wherein said piston and said guide bore in said housing form a working chamber to which pressure may be applied via said control pressure medium against the force of said valve spring for changing over to said first valve position in which said outer valve seat is opened and said inner valve seat is closed.

2. A pressure measuring device as in claim 1, wherein said valve seats comprise bevel seats.

3. A pressure measuring device as in claims 1 or 2, wherein the surface area on said steering piston normal to the direction of motion of the piston, which is exposed to the pressure to be measured in said first valve position and is situated on that side of said piston which gives rise to a force co-directional with said control pressure, is larger than that pressure-exposed area which would cause an opening of said inner valve seat.

* * * * *